United States Patent [19]

Umeda et al.

[11] Patent Number: 4,910,787
[45] Date of Patent: Mar. 20, 1990

[54] DISCRIMINATOR BETWEEN HANDWRITTEN AND MACHINE-PRINTED CHARACTERS

[75] Inventors: Tetsuo Umeda; Shigenobu Kasuya, both of Tokyo, Japan

[73] Assignee: NEC Corporation, Japan

[21] Appl. No.: 182,518

[22] Filed: Apr. 18, 1988

[30] Foreign Application Priority Data

Apr. 20, 1987 [JP] Japan .................................. 62-95268

[51] Int. Cl.$^4$ .............................................. G06K 9/46
[52] U.S. Cl. .......................................... 382/25; 382/9; 382/18; 382/24
[58] Field of Search ................... 382/9, 24, 18, 19, 27, 382/25, 16

[56] References Cited

U.S. PATENT DOCUMENTS

| | | | |
|---|---|---|---|
| 4,379,283 | 4/1983 | Ito et al. | 382/27 |
| 4,516,262 | 5/1985 | Sakurai | 382/36 |
| 4,630,307 | 12/1986 | Cok | 382/25 |

*Primary Examiner*—Leo H. Boudreau
*Assistant Examiner*—Joseph Mancuso
*Attorney, Agent, or Firm*—Leydig, Voit & Mayer

[57] ABSTRACT

A video image of a region including characters recorded on a document is converted into electric signals. From the electric signals unit signals corresponding to subregions obtained by dividing the region is picked up. Horizontal, vertical and slanted stroke components included in each of the subregions are detected from the unit signals. The detected numbers of the horizontal, vertical and slanted stroke components are counted. The ratio of the counted numbers of the slanted stroke component to the total of the horizontal, vertical and slanted stroke components is calculated. The characters on the document is judged as handwritten ones and machine-printed ones if the ratio is above and not above a predetermined threshold, respectively. The threshold is preferably set at 0.2.

10 Claims, 3 Drawing Sheets

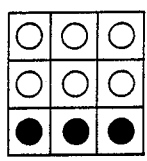 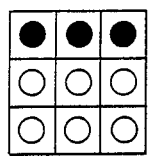 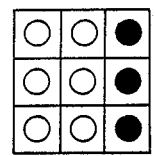 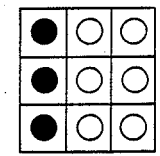
FIG.1A   FIG.1B   FIG.1C   FIG.1D
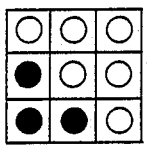 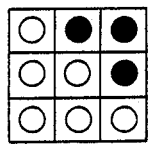 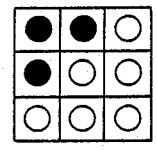 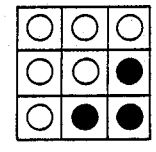
FIG.1E   FIG.1F   FIG.1G   FIG.1H
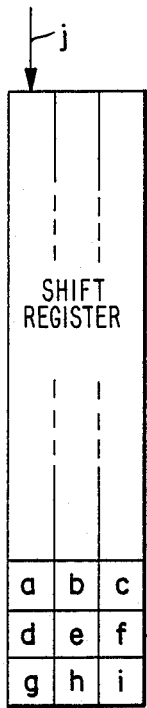
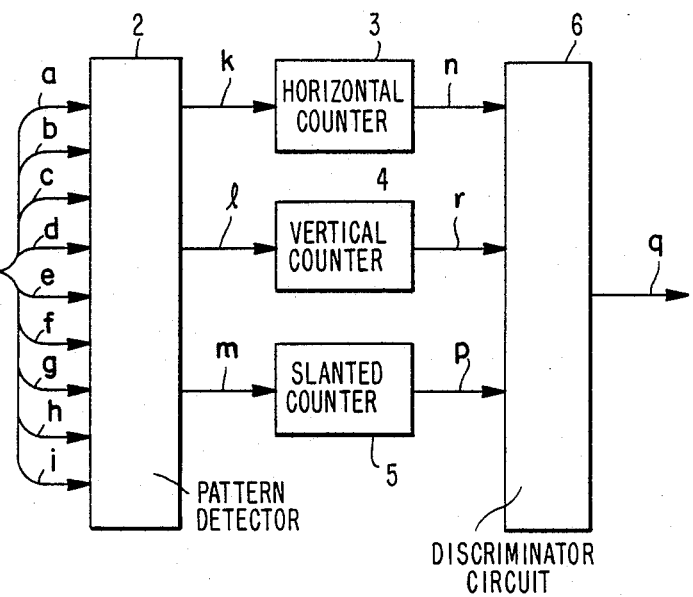
FIG. 2

U.S. Patent     Mar. 20, 1990     Sheet 3 of 3     4,910,787
FIG.4J
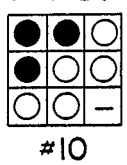
10
FIG.4E
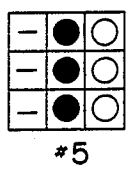
4
FIG.4G
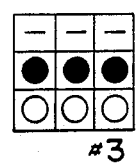
3
FIG.4I
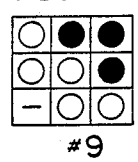
9
FIG.4C
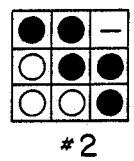
2
FIG.4B
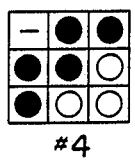
5
FIG.4A
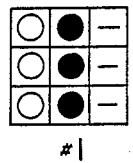
1
FIG.4D
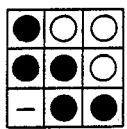
6
FIG.4F
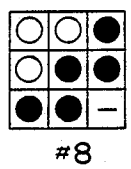
8
FIG.4K
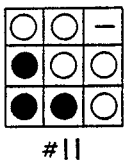
11
FIG.4H
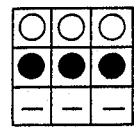
7
FIG.4L
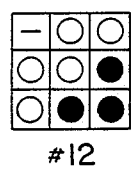
12
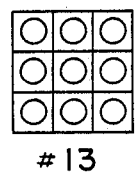
13
FIG.4M
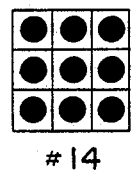
14
FIG.4N

DISCRIMINATOR BETWEEN HANDWRITTEN AND MACHINE-PRINTED CHARACTERS

BACKGROUND OF THE INVENTION

The present invention relates to a discriminator for discriminating between handwritten and machine-printed characters recorded on a document such as mail.

A ZIP code written on the mail is recognized with an optical character reader (OCR). The numerals of such ZIP code are usually handwritten or machine-printed. For recognizing the machine-printed character, the similarity of their overall shapes is used for the judgment criterion. On the other hand, the similarity of the handwritten character is determined on the basis of the feature of "unit line" such as horizontal, vertical or slanted lines. The slanted lines include lines with the right or left end up, and springing up at the end. For effective recognition, there have been provided two OCR's for the respective handwritten and machine-printed character recognitions. However, no technique has not been proposed for discriminating between the two. Handwritten characters are, therefore, often processed with the OCR for machine-printed characters, resulting in error recognition.

If it is known before the recognition with OCR whether the characters are machine-printed or handwritten, such error recognition can be avoided, thereby to increase the processing speed.

SUMMARY OF THE INVENTION

An object of the present invention is, therefore, to provide a discriminator for discriminating whether given characters are handwritten or machine-printed.

Another object of the invention is to provide an apparatus for recognizing characters recorded on a document with a high degree of accuracy.

According to one aspect of the present invention, a video image of a region including characters recorded on a document is converted into electric signals. From the electric signals unit signals corresponding to subregions obtained by dividing the region is picked up. Horizontal, vertical and slanted stroke components included in each of the subregions are detected from the unit signals. The detected numbers of the horizontal, vertical and slanted stroke components are counted. The ratio of the counted numbers of the slanted stroke component to the total of the horizontal, vertical and slanted stroke components is calculated. The characters on the document is judged as handwritten ones and machine-printed ones if the ratio is above and not above a predetermined threshold, respectively. The threshold is preferably set at 0.2.

Other objects and features of the present invention will be clarified from the following description when taken in conjunction with the drawings.

BRIEF DESCRIPTION OF THE DRAWINGS

FIGS. 1A-H are a diagram illustrating the horizontal, vertical and slanted arrangements of stroke pixel signals for use in a preferred embodiment of the present invention;

FIG. 2 is a block diagram illustrating the embodiment of the invention;

FIGS. 4-N are a diagram illustrating an example of stroke components used in FIG. 4.

DETAILED DESCRIPTION OF THE PREFERRED EMBODIMENTS

Figure 3:
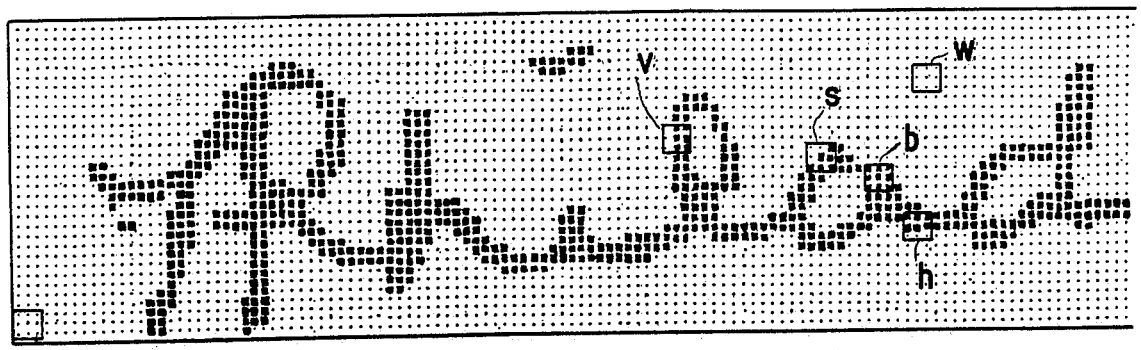
FIG. 3 is a diagram illustrating an example of handwritten English letters used for testing the benefits of the invention.

In the present invention, the character portion on the document is divided into a plurality of small subregions (unit regions) by optically scanning the portion. It is to be assumed here that the character is comprised of horizontal, vertical and slanted strokes (lines). Unit region video signals are obtained with the optical scanner unit region by unit region. The discrimination of the handwritten character from the machine-printed character is performed by detecting that the occurrence ratio of the slanted stroke (line) component to the total of horizontal, vertical and slanted stroke components is above a predetermined level. This criterion has been experimentally testified.

The unit region may contain, as illustrated in FIG. 1, $3 \times 3$ or 9 pixels. In FIG. 1, A and B represent horizontal, C and D; vertical, and E, F, G and H; slanted stroke components.

A predetermined region including characters on the document is scanned with known optical scanner so as to obtain video signals, each comprising pixel signals of binary values "1" and "0".

Referring to FIG. 2, in a preferred embodiment of the invention, a pixel signal j is stored in a shift register (memory) 1. By structuring a suitable shift register, it is made possible to store signals a to i, each corresponding to one of the pixel signals of a unit region in FIG. 1, in specified area as shown in FIG. 2. The pixel signals a to i for the unit region are supplied to a pattern detecting circuit 2. The circuit 2 compares the arrangement of "1" values (black circles in FIG. 1) in each of the pixel signals a to i with the pattern arrangement A to H in FIG. 1, and generates identity signals k, l and m if the pixel arrangement coincide with the horizontal stroke components of A and B, the vertical stroke components of C and D and the slanted stroke components of E to H in FIG. 1, respectively.

The next unit region to be scanned (the unit region either vertically or horizontally shifted) is processed in the same manner, and all the remaining unit regions of the whole region to be scanned on the document are similarly processed. The identity signals k, l and m are supplied to a horizontal component counter 3, a vertical component counter 4 and a slanted component counter 5, respectively. The counters 3, 4 and 5 count the number of the generation of the identity signals k, l and m and generates the counted number signals n, r and p, respectively. A discriminating circuit 6 calculates the ratio R of the counted number of slanted strokes P to the total counted number of horizontal, vertical and slanted strokes (n+r+p) in accordance with Equation (1).

$$R = \frac{P}{n + r + p} \quad (1)$$

The discriminating circuit 6 recognizes the characters recorded on the document as "handwritten characters" when the ratio R is above a predetermined threshold (which may be, for instance, 0.2), or machine-printed when it is not.

FIG. 3 illustrates an example of handwritten characters used for discrimination in the experiment based on the present invention. The character region scanned is the "Philad" portion of "Philadelphia", and consists of 37×128 pixels. In FIG. 3, small points with equal intervals arranged in horizontal and vertical directions represent the center positions of the pixels.

The patterns of the horizontal, vertical and slanted stroke components used in the experiment are illustrated in FIG. 4. The components are classified into a total of eight patterns #1 through #8. The patterns #1 and #5 represent vertical stroke components and are denoted by ⓥ is #2 and #6; slanted stroke components with the right end down and #4 and #8, slanted stroke components with the right end up, all denoted by ⓢ ; and #3 and #7, horizontal stroke components, denote by ⓗ . In FIG. 4, a black circle represents "1", a blank circle; "0"; and a dash "—"; a part irrelevant to stroke identification whether a black or a blank circle. In this embodiment, as stated above, horizontal, vertical and 45° slanted stroke components are used. Since the deviation of the character alignment on the documents is usually ±30° at most, it does not significantly affect the accuracy of discrimination in accordance with the present invention. Here, the patterns #9 though #12 are included in slanted stroke components.

Referring back to FIG. 3, the object region is scanned with a scanning line of about 0.25 mm in width, for example, first in the vertical direction from the top left corner, then again in the vertical direction shifted by 0.25 mm (one scanning line's width) from the first vertical scanned line, and so on till the scanning reaches the bottom right corner. The signals obtained by vertical scanning are sampled with clocks of a predetermined frequency, which is determined by the scanning speed, to obtain pixel signals at 0.25 mm intervals in the vertical direction. The sampled signals are compared with the predetermined threshold, and converted into binary pixel signals of "1" or "0". Thus obtained pixel signals constitute the signal j of 37×128.

Figure 5:
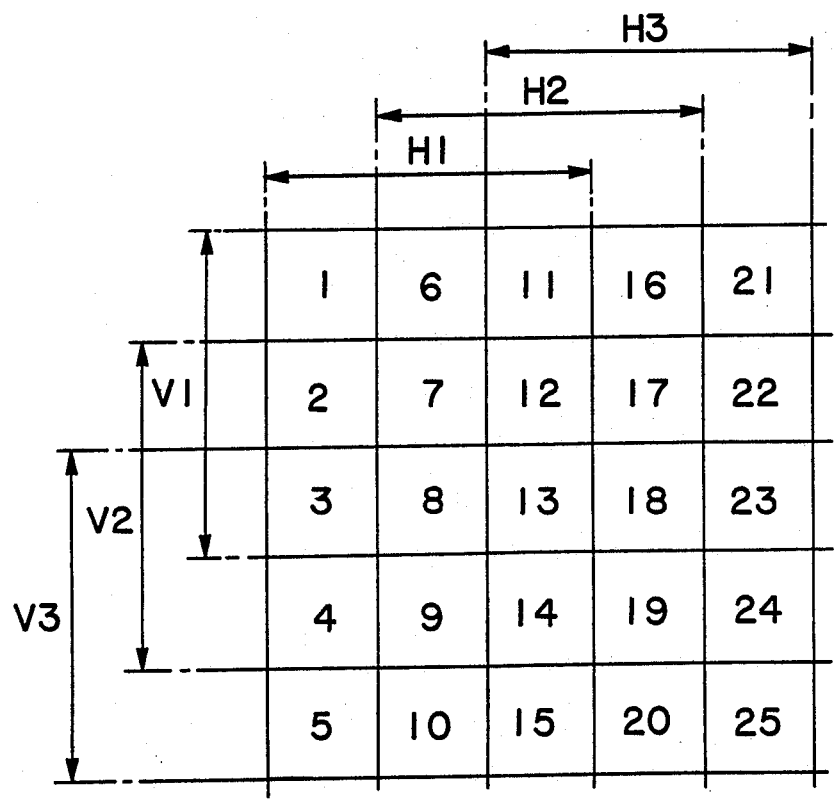
FIG. 5 is a diagram for describing the situations of the shifting of a subregion in a region to be recognized.

The shift register 1 shown in FIG. 2 comprises three rows of unit shift registers each having 37 stages. Data are inputted from the top, and shifted successively downward and from the bottom of a row to the top of the next row. The pixel signal j is inputted from the top left of the shift register 1, and successively shifted in response to clocks of a predetermined frequency. At a certain time point, as illustrated in FIG. 1, signals a through i of a unit region are stored in the shift register 1. Each of these signals a through i constitutes a unit pattern comprising 3×3 pixels, and is supplied to the patter detecting circuit 2. The circuit 2 detects the presence of the horizontal, vertical or slanted stroke component. Incidentally, if the shift register 1 is suitably structured, it will also be possible to successively extract unit patterns shifted by a one-pixel equivalent each in the horizontal and vertical directions. This shifted extraction by one-pixel brings about the effect of the reducing the scanning intervals in the vertical and horizontal directions. Thus, in vertically shifting from one unit pattern to the next in the arrangement illustrated in FIG. 5, the first unit pattern to be extracted could consist of the pixel components of H1 in the horizontal and of V1 in the vertical direction, followed by the second consisting of those of H1 again in the horizontal and of V2 in the vertical direction and then by the third consisting still of H1 in the horizontal and of V3 in the vertical direction. Horizontal shifting of the unit pattern to be extracted would take place, with the V1 range of pixel components in the vertical direction kept unchanged, from the first unit pattern of V1 by H1 to V1 by H2 and then to V1 by H3.

The unit pattern signals a through j extracted from the shift register 1 in this manner are, as stated above, subjected to determination of the presence or absence of horizontal, vertical and slanted stroke components by the pattern detecting circuit 2. Th resultant identify signals k, l add m for horizontal, vertical and slanted stroke components are supplied to the counters 3, 4 and 5, respectively. In the object region of FIG. 3 is shown one example each of a vertical stroke ⓥ , a horizontal stroke ⓗ and a slanted stroke ⓢ . In the figure, ⓦ denotes a subregion where no lines are present (all pixel signals are "0" corresponding to the pattern #13 in FIG. 4); and ⓑ , a subregion where all pixel signals are "1" (corresponding to the pattern #14 in FIG. 4).

The numbers of the counted stroke components are obtained in this experiment as shown below:

| | |
|---|---|
| v = 109, | v/(v + s + h) = 0.38 |
| s = 79, | s/(v + s + h) = 0.28 |
| h = 96, | h/(v + s + h) = 0.34 |
| b = 92 | |
| w = 2392 | |

In this case, since the value of R in Equation (1) is 0.28, the characters are recognized as handwritten characters. The results of various experiments indicate that the threshold for recognizing the given characters as handwritten ones should be desirably not less than 0.2 (20%). In the experiment, English characters of handwritten on the mails of 400 and of machine-printed on the mails of 400 were discriminated with a threshold R of 0.20 and the correct discrimination ratio was over 95%, demonstrating the effectiveness of the present invention.

What is claimed is:

1. A discriminator between handwritten and machine-printed characters comprising:

means for picking up in the form of electric signals a video image of a region including characters recorded on a document;

means for successively extracting from said electric signals unit pattern signals each corresponding to one of subregions obtained by dividing said region;

means for detecting horizontal stroke, vertical stroke or slanted stroke components included in each of the extracted unit patterns of the unit pattern signals;

horizontal, vertical and slanted stroke counters for counting the numbers of the detections of said horizontal, vertical and slanted stroke components, respectively;

means for calculating a ratio R of the output of said slanted stroke counter to the total of the outputs of all said horizontal, vertical and slanted stroke counters; and means for discriminating said characters as handwritten ones and machine-printed ones if said ratio R is above and not above a predetermined threshold, respectively.

2. A discriminator according to claim 1, wherein said threshold is 0.2.

3. A discriminator according to claim 1, wherein said unit pattern signals are extracted so as to involve a part of a unit pattern signal extracted immediately before.

4. A discriminator according to claim 1, wherein said unit pattern signal consists of signals for a total of nine pixels, arranged in three lines by three rows.

5. A discriminator comprising:
scanning means for optically scanning a predetermined region including characters recorded on a document in a predetermined scanning width and converting video image thereof into electric signals;
sampling means for sampling said electric signals with a clock signal of a predetermined frequency and outputting the sampled signal as pixel signals;
memory means for temporarily storing said pixel signals;
means for successively reading out from said memory means unit region signals each consisting of m lines by n rows of pixel signals as unit pattern signals, m and n representing natural numbers;
means for extracting horizontal stroke, vertical stroke or slanted stroke component of the characters on the basis of pixel signals contained in said unit pattern signal;
means for calculating the ratio of the number of the slanted stroke components to the total number of the horizontal, vertical and slanted stroke components extracted from the unit pattern signals for said predetermined region; and
means for discriminating said characters as handwritten ones if said ratio is above a predetermined threshold or as machine-printed ones if it is not above the threshold.

6. A discriminator according to claim 5, wherein said threshold is 0.2.

7. A discriminator according to claim 5, wherein said unit pattern signals are extracted so as to involve a part of the unit pattern signal extracted immediately before.

8. A discriminator according to claim 5, wherein said unit pattern signal consists of signals for a total of nine pixels, arranged in three lines by three rows.

9. A handwritten character discriminating apparatus comprising:

a register for storing a video image of a predetermined region containing characters read out by a photoelectric converter-scanner;
means for picking up from said register subregion pixel signals of said video image as unit signals;
a pattern memory for storing predetermined pattern signals of horizontal, vertical and slanted stroke lines;
comparator means for comparing said unit signals with pattern signals read out from said pattern memory and generating an identity signal for each of unit signals found identical with one of said pattern signals;
counter means for counting the number of generation of the identity signals for each stroke line generated from said comparator means;
arithmetic means for receiving the outputs of said counter means and calculating the ratio of the number of generation of the identity signals for said slanted stroke line to the total number of generation of the identity signals for said horizontal, vertical and slanted stroke lines; and
discriminating means for discriminating said characters as handwritten ones if said ratio is greater than a predetermined threshold.

10. A method for identifying handwritten characters and machine-printed characters comprising the steps of:
converting a video image of a predetermined region containing characters on a document into electric signals;
picking up from said electric signals unit signals corresponding to subregions obtained by dividing said predetermined region;
detecting horizontal, vertical or slanted stroke components included in each of said subregions from said unit signals;
counting numbers of the detections of the horizontal, vertical and slanted stroke components, respectively;
calculating a ratio of the counted numbers of the slanted stroke component to the total of the horizontal, vertical and slanted stroke components; and
judging said characters on the document as handwritten ones and machine-printed ones if said ratio is above and not above a predetermined threshold, respectively.

* * * * *